United States Patent Office 3,795,640

Patented Mar. 5, 1974

3,795,640

FURFURYL, ALLYL AND METHYLOL ACRYLAMIDE ESTERS OF POLYMERIC ACIDS

Kailash C. Pande, Farmingdale, and Richard J. Stattel, East Rockaway, N.Y., assignors to Powers Chemco, Inc., Glen Cove, N.Y.

No Drawing. Filed Jan. 7, 1971, Ser. No. 104,806
Int. Cl. C08f 27/12
U.S. Cl. 260—78.5 R 11 Claims

ABSTRACT OF THE DISCLOSURE

Light-sensitive film forming polymers are disclosed which comprise furoate-, allyl- or methylol acrylamide-esterified polymeric acids. Their use in photolithography and photomechanical processes is also disclosed.

BACKGROUND OF THE INVENTION

This invention relates generally to new photopolymers for use in photolithography and photomechanical processes and, more patricularly, to light-sensitive organic solvent soluble film forming polymers capable of forming a continuous coating on a base consisting of esterified carboxyl-containing polymers.

For many years, photomechanical reproduction has depended primarily upon the use of a colloidal layer of gum arabic or other similar material containing a photosensitive hardening agent such as a bichromate salt. More recently, the use of light-sensitive diazo compounds has resulted in the manufacture of presensitized plates, i.e., plates to which the light sensitizing agent may be applied prior to actual use. The bichromated colloids and the diazo compounds, however, have several material disadvantages which restrict their application and use.

One such inherent disadvantage of the diazo compounds, for example, is their tendency to decompose chemically upon contact with a metal surface. Consequently, when a diazo compound is to be used over a metal plate, an intervening protective sublayer must be used. If the sublayer is not properly formed, the resulting lithographic plate may be defective or have a short storage life.

Bichromated colloids deteriorate relatively rapidly after coating, thus making them unsuitable for use when long shelf life is desired. Moreover, many of the colloidal light-sensitive materials presently employed as resists for etching require a relatively high temperature oven bake prior to use, thereby increasing the cost and complicating the process of preparation.

It has now been found that carboxyl-containing polymers having the following structural backbones may be synthetically modified to provide the novel polymers of this invention:

(a)

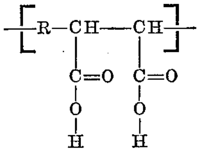

wherein R is $—CH_2—CH=CH—CH_2—$, $—CH(\phi)—CH_2—$ or $—CH(OCH_3)—CH_2—$ and (b)

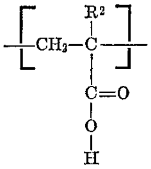

wherein $R^2$ is hydrogen or alkyl containing from 1 to 4 carbon atoms.

The above shown polymers are esterified with an alcohol such as furfuryl alcohol, allyl alcohol or derivatives thereof or with methylol acrylamide to yield the desired esterified carboxyl-containing polymers found to be advantageous light-sensitive materials in photolithography and photomechanical processes.

SUMMARY OF THE INVENTION

Accordingly, this invention discloses and claims a light-sensitive organic solvent soluble film forming polymer capable of forming a continuous coating on a base which comprises recurring units of an esterified carboxyl-containing polymer having the structures:

(c)

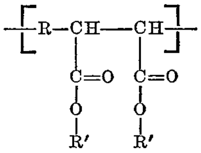

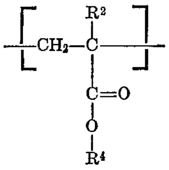

wherein R is $—CH_2—CH=CH_2—$, $—CH(\phi)—CH_2—$ or $—CH(OCH_3)—CH_2$

R′ is $—CH_2—NH—C(=O)—CH=CH_2$, $—CH_2—CH=CH_2$ or $—CH_2—$ 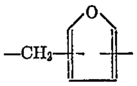

$R^3$, wherein $R^3$ is H, alkyl or alkenyl of up to 12 carbon atoms, aryl, alkaryl or aralkyl of from 6 to 9 carbon atoms, halogen (F, Cl, Br, I), nitro, cyano, hydroxy, acetylamino, amino, alkoxy, carboalkoxy, mono- or di-alkylamine, N-alkyl - carbamyl, N,N-dialkylcarbamyl, alkylsulfonyl, said alkyl groups containing from 1 to 4 carbon atoms, trifluoromethyl, trifluoromethoxy, methoxymethyl, carbamyl, alkanoyloxy containing up to 4 carbon atoms, phenyl, p-chlorophenyl, p-methylphenyl or p-aminophenyl;

$R^2$ is hydrogen or alkyl containing from 1 to 4 carbon atoms; and $R^4$ is the same as R′.

Particularly preferred polymers are those wherein R is $—CH(OCH_3)—CH_2—$ and R′ is allyl or furfuryl [type (c)] and those wherein $R^2$ is H or methyl and $R^4$ is allyl [type (d)].

A preferred embodiment of this invention is a polymer as defined above in which the carboxyl-containing polymer is esterified to the extent of at least 25% and preferably, more than 60%. Also preferred are carboxyl-containing polymers as shown above which have molecular weight in the range from 1,500 to 100,000.

Still another preferred embodiment of this invention relates to the combination of the above polymers with a sensitizing agent, such as a cyclic compound which contains one or more carbonyl groups.

Another preferred embodiment of the present invention relates to a process for producing photographic resist images by the photochemical cross-linking of a polymeric material which comprises exposing a photographic element to actinic light through a process transparency wherein said photographic element comprises a support or substrate having thereon a photosensitive layer comprising a polymer as claimed in claim 1 whereby in the exposed areas said polymeric material is cross-linked to the insoluble state and after removal of the soluble photosensitive material in the unexposed areas, results in a photographic resist image.

It is the purpose of this invention to provide a new class of film forming polymers which are sensitive to light. These resist materials are effectively utilized in the preparation of printing plates for letterpress, lithography, for resist imaging, for printed circuits and chemical machining.

DETAILED DESCRIPTION OF THE INVENTION

The herein described polymers are prepared by an esterification procedure whereby a carboxyl-containing polymer preferably having a molecular weight of from 1500 to 100,000 is esterified with an alcohol such as furfuryl alcohol, allyl alcohol or derivatives thereof or with methylol acrylamide.

The carboxyl-containing polymer starting materials are categorized into two groups (a) and (b) shown above simply for the sake of convenience. Type (a) are copolymers of butadiene, phenylethylene or methylvinyl ether with maleic anhydride. Type (b) are homopolymers or copolymers derived from acrylic acids and their derivatives.

These materials are easily prepared using well documented synthetic procedures or are available on a commercial scale. For instance, Gantrez No. 139, a trademarked product of General Aniline and Film is a copolymer of methylvinyl ether and maleic anhydride. Butadiene-maleic anhydride copolymers are commercially available. The same is true for polyacrylic acid and polymethacrylic acid.

The above described carboxyl-containing polymers are converted to the corresponding esters by reacting said polymers with the appropriate alcohol. The alcohol reagent can be of three types: furfuryl alcohol or derivatives thereof, allyl alcohol or methylol acrylamide. These materials are described in the chemical literature or are available commercially.

Since the reaction is a well-known technique, standard procedures may be relied upon. For instance, although it is preferred to use the acid reagent in the form of its acid chloride, it is possible, although less desirable, to utilize the free acid. The latter method is less preferred because yields tend to be lower and reaction conditions must be more closely controlled. The acaid can be converted to its acid chloride derivative by treatment with a suitable chlorinating agent such as thionyl chloride or phosphorus trichloride.

Although it is possible to isolate and purify the acid chloride prior to reaction with alcohol, it is not expedient to do so. One simply reacts the crude acid chloride formed with the alcohol under esterification conditions.

A typical esterification procedure for purposes of this invention is as follows: the carboxyl-containing polymer is converted to the corresponding acid chloride by treatment with a chlorinating agent, for example, thionyl chloride. An excess amount of said chloride is used and the reaction is generally carried out under slightly elevated temperatures, e.g., 60° C. for about 1 hour. The unreacted thionyl chloride is then removed under partial vacuum leaving the acid chloride. The intermediate is then ready for the next step: purification is usually unnecessary.

The above reaction may also be effected in the presence of a solvent. A typical one for that purpose is diethyl ether. Upon stripping the excess thionyl chloride, the lower boiling solvent is simultaneously removed.

The crude acid chloride is dissolved in a suitable solvent such as methyl isobutyl ketone, combined with alcohol reagent and the resulting mixture heated at elevated temperatures, usually not higher than 100° C. for a period of ¼ to 3 hours.

Any solvent is applicable so long as it does not react with starting reagents or final products. Illustrative of operable solvents are: hydrocarbons, chlorinated hydrocarbons, ethers, etc.

The reaction work-up is typical for polymer isolation: a solvent such as acetone is highly effective in dissolving small amounts of organic impurities and is added for that purpose. Other solvents may serve in that capacity as well. The entire mixture after dilution with acetone is then poured into a large volume of water. The actual amount is not critical and will generally be about four times the volume of the reaction mixture. An excess is used simply to insure the complete precipitation of desired product.

The polymeric materials within the purview of this invention are light-sensitive and are capable of being sensitized to increase their sensitivity to actinic rays. The photosensitive resist solution which consists of the above described polymers dissolved in a solution may be coated on a plate to become a printing member of other etched or plated surface and, after drying and exposure to actinic light, may be developed to remove the unexposed portions of the polymer by immersion in a suitable organic solvent. Thereafter, the plate may be etched or plated in a conventional manner.

Among the useful volatile organic solvents which contain the polymers described herein include: 1,4-dioxane, methyl glycol ester, nitromethane, ethylene dichloride, butyrolactone, diethylene glycol acetate, chloroform, methylethyl ketone and other organic nonreactive solvents. Many of these same solvents may also be used as a developer.

The sensitizer which can be added to the polymer containing solution contains one or more carbonyl groups. Representative examples include:

4-methyl benzophenone
4,4′-bis-diethylamino benzophenone
4-4′-bis-diethylamino benzophenone
Bis-p-methylstyryl ketone
4-methylumbelliferone
2-methyl-1,4-naphthoquinone
N-methyl-2-quinolone
2-nitrofluorene
3-(2-furyl)acrylophenone
2-furaldoxime
Cholesteryl crotonate
1,2-naphthoquinone
5-phenyl-2,4-pentadienophenone
Benzanthracene-7-12-dione
Benzanthracene-7-one
Benzil
Benzophenone These sensitizers are generally added in amounts of 2.5% to 10% by weight based on the weight of the photosensitive polymer.

The sensitizer may be applied either in solution with the polymer or separately from a suitable solvent over the photopolymer after it has been applied to a support member. It is preferable, however, that the sensitizing agent be applied in a solution with the polymer.

In order to regulate or control the degree of cross-linking and/or to stabilize the photosensitive polymer over a period of time, an inhibitor may be added. Typical inhibitors include: hydroquinone, m-methoxyphenol, p-methoxyphenol, guaicol, chloranil and 4-t-butylcatechol.

This invention is also concerned with the formation of plates and films derived from the photosensitive mixture of the herein subject polymers and sensitizing agent. The process used makes possible the formation of coated printing films on any substrate by the deposition of the photosensitive mixture using well-known techniques. Typical substrates include metal sheets, e.g., copper, aluminum, zinc, etc., glass, cellulose, ester film, polyvinyl acetal film, polystyrene film, polyethylene tereppthhalate film, etc.

When the support material carrying the photosensitive composition is light-reflecting, there may be present, e.g., superposed on said support and adherent thereto or in the surface thereof, a layer or stratum absorptive of actinic light such as to minimize reflectance from the combined support of incident actinic light.

The plates formed wholly of or coated with the photosensitive composition are useful in photography, photomechanical reproduction, lithography and intaglio printing. More specific examples of such uses are offset printing, silk screen printing, duplicating pads, manifold stencil sheeting coatings, lithographic plates, relief plates and gravure plates. The term "printing plates" are used in the claims is inclusive of all of these.

They are also of great value in the printed circuit industry, as etching and electroplating resists, and for defining integrated circuit images. Other uses are for chemical machining and for nameplate processes, where metals are removed by etching according to the photographic resist image.

Example I

A copolymer of methyl vinyl ether and maleic anhydride, Gantrez No. 139* (10 g.) is combined with thionyl chloride (40 g.) and the mixture heated to about 60° C. for about 1 hour. The excess thionyl chloride is removed under reduced pressure leaving the corresponding acid chloride.

This intermediate product is dissolved in carbon disulfide (40 ml.) and allyl alcohol (8 g.) is then added. After refluxing for 4 hours, the reaction mixture is diluted with acetone (120 ml.) and poured into a large volume of methyl alcohol. The precipitated product is filtered, water washed and air dried to provide good yields of product.

Example II

The acid chloride of methyl vinyl ether-maleic anhydride copolymer as prepared by the procedure of Example I (10 g.) is combined with furfuryl alcohol (13 g.) in N-methyl-2-pyrrolidone (40 ml.). The reaction mixture is heated for 4 hours at 75° C. Upon cooling the mixture, it is precipitated into methanol and the precipitated product is filtered, water washed and air dried. The desired product is obtained in substantial yields.

Example III

Polymethacrylic acid (10 g.) is refluxed under moisture-free conditions with thionyl chlorid (40 ml.) for about 2 hours. Thereafter, volatiles are removed under reduced pressure leaving polymethacrylic acid chloride. Allyl alcohol (7.0 g.) and N-methyl-2-pyrrolidone (40 ml.) are added and the reaction mixture heated at 70° C. for 4 hours. After cooling, the mixture is diluted with acetone (120 ml.) and then poured into a large volume of methanol.

The precipitated product, allyl ester of polymethacrylic acid, is filtered, water washed and air dried to give good yields of product.

Example IV

The procedure of Example I is repeated except a butadiene-maleic anhydride copolymer is used in place of the methyl vinyl ether-maleic anhydride copolymer and the corresponding furfuryl ester polymer product is obtained in good yields.

Example V

The procedure of Example I is repeated except a styrene-maleic anhydride copolymer is used in place of the methyl vinyl ether-maleic anhydride copolymer and the corresponding furfuryl ester polymer product is obtained in good yields.

Example VI

The procedure of Example III is repeated wherein polyacrylic acid, in equivalent amounts, is used in lieu of polymethacrylic acid with comparable results.

Example VII

The acid chloride of methyl vinyl ether-maleic anhydride copolymer as prepared by the procedure of Example I (10 g.) is combined with methylol acrylamide (5 g.) in N-methyl-2-pyrrolidone (40 ml.). The reaction mixture is heated for 2 hours at 70° C. Upon cooling, this was poured into methanol. The precipitated polymer was filtered, washed with water and methanol, and was dried in air to yield the desired product.

Example VIII

The procedure of Example II is repeated wherein the following furfuryl alcohol derivatives are used in place of furfuryl alcohol:

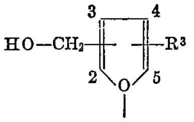

3-methyl-2-furfuryl alcohol
4-dodecyl-2-furfuryl alcohol
4-dodecenyl-2-furfuryl alcohol
5-propenyl-2-furfuryl alcohol
4-phenyl-2-furfuryl alcohol
4-(p-methylphenyl)-2-furfuryl alcohol
4-phenylethyl-2-furfuryl alcohol
3-chloro-2-furfuryl alcohol
4-bromo-2-furfuryl alcohol
5-iodo-2-furfuryl alcohol
3-fluoro-2-furfuryl alcohol
3-hydroxy-2-furfuryl alcohol
5-cyano-2-furfuryl alcohol
5-acetyl-2-furfuryl alcohol
3-amino-2-furfuryl alcohol
4-dimethylamino-2-furfuryl alcohol
5-trifluoromethyl-2-furfuryl alcohol
5-trifluoromethoxy-2-furfuryl chloride
4-methoxy-2-furfuryl chloride
5-butylamino-2-furfuryl chloride
5-acetoxy-2-furfuryl chloride
3-carbamyl-2-furfuryl chloride
4-butoxy-2-furfuryl chloride
5-dimethylcarbamyl-2-furfuryl chloride
5-propylcarbamyl-2-furfuryl chloride
5-butylsulfonyl-2-furfuryl chloride
5-methoxymethyl-2-furfuryl chloride
5-carbobutoxy-2-furfuryl chloride
5-phenyl-2-furfuryl chloride
5-(p-chlorophenyl)-2-furfuryl chloride
5-(p-methylphenyl)-2-furfuryl chloride
5-(p-aminophenyl)-2-furfuryl chloride

Example IX

Photochemical insolubilization: The polymer prepared according to Example I (0.7 g.) is dissolved in monochlorobenzene (10 ml.) containing benzanthracene-7,12-dione (0.056 g.). This solution is then applied to a fine-grained lithographic aluminum plate by a wipe-on technique. After drying, it is exposed for 200 seconds to an 8000 watt pulsed xenon lamp at a distance of 36 inches through a photographic film transparency.

The unexposed portions are removed with a mixture of 25% methyl glycol acetate and 75% xylol in a minute's time. A clean image results having a printing speed about twice as fast as a standard diazo lithographic coating.

A plate made by this process is attached to a lithographic press producing very satisfactory prints.

*A trademarked product of General Aniline and Film Corp. identified as Gantrez No. 139.

Example X

Photochemical insolubilization: The polymer prepared according to Example II is solubilized as in Example IX. It is applied to a copper plate and exposed to a pulsed xenon light source. After developing in a mixture of xylol and methyl glycol ester, a clean image with excellent light sensitivity is produced. The copper plate is then etched with ferric chloride.

Example XI

The polymer prepared according to the method of Example III is solubilized and sensitized as shown in Example IX. It is applied to a copper plate, dried and exposed to a pulsed xenon lamp through a transparent film negative. After developing with methyl glycol acetate-xylol, a plate useable for photoengraving etching is produced.

Example XII

The procedure of Example XI is repeated except the following sensitizers in equivalent amounts are used instead of benzanthracene-7-12-dione with comparable results:

4-methyl benzophenone
4,4'-bis-dimethylamino benzophenone
4,4'-bis-diethylamino benzophenone
Bis-p-methylstyryl ketone
4-methylumbelliferone
2-methyl-1,4-naphthoquinone
N-methyl-2-quinolone
2-nitrofluorene
3-(2-furyl) acrylophenone
2-furaldoxime
Cholesteryl crotonate
1,2-naphthoquinone
5-phenyl-2,4-pentadieneophenone
Benzanthracene-7-one
Benzil
Benzophenone

Example XIII

The procedure of Example VII is repeated except an acid chloride of butadiene-maleic anhydride copolymer is used in place of acid chloride of methyl vinyl ether-maleic anhydride copolymer. The corresponding methylol acrylamide ester polymer was isolated in satisfactory yields.

Example XIV

The procedure of Example VII is repeated except an acid chloride of styrene-maleic anhydride copolymer is used in place of the acid chloride of methyl vinyl ether-maleic anhydride copolymer. The desired end product is obtained in good yields.

Example XV

The acid chloride of polymethacrylic acid was prepared from polymethacrylic acid and thionyl chloride as in Example III. This acid chloride (10 g.) was reacted with methylol acrylamide (7.5 g.) in N-methyl-2-pyrrolidone (75 ml.) at 75° C. for 2 hours. The end product was obtained by precipitating in ethanol.

Example XVI

The procedure of Example II is repeated except the following polymer acid chlorides in stoichiometric equivalent amounts are used in place of methyl vinyl ether-maleic anhydride copolymer acid chloride with comparable results:

butadiene-maleic anhydride copolymer
styrene-maleic anhydride copolymer
polyacrylic acid.

What is claimed is:

1. A light-sensitive organic solvent-soluble film forming polymer capable of forming a continuous coating on a base which comprises recurring units of an esterified polymer having the structure:

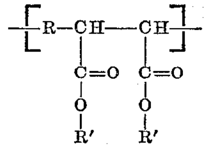

or

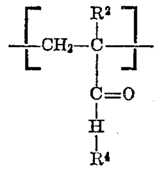

wherein R is

—CH$_2$—CH=CH—CH$_2$—, —CH(Φ)—CH$_2$— or —CH(OCH$_3$)—CH$_2$—

R' is

—CH$_2$—NH—C(=O)—CH=CH$_2$ or

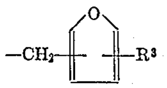

wherein R$^3$ is alkyl or alkenyl of up to 12 carbon atoms, aryl, alkaryl or aralkyl of from 6 to 9 carbon atoms, halogen (F, Cl, Br, I), nitro, cyano, hydroxy, acetylamino, amino, alkoxy, carboalkoxy, mono- or di-alkylamino, N-alkylcarbamyl, N,N-dialkylcarbamyl, alkylsulfonyl, said alkyl groups containing from 1 to 4 carbon atoms, trifluoromethyl, trifluoromethoxy, methoxymethyl, carbamyl, alkanoyloxy containing up to 4 carbon atoms, phenyl, p-chlorophenyl, p-methylphenyl or p-aminophenyl; R$^2$ is hydrogen or alkyl containing from 1 to 4 carbon atoms; and R$^4$ is

[—CH$_2$—NH—C(=O)—CH=CH$_2$]

the same as R', said polymer having a molecular weight of from 1500 to 100,000 and esterified to the extent that at least 25% of the —COOH groups are reacted.

2. A polymer as claimed in claim 1 having the recurring unit structure

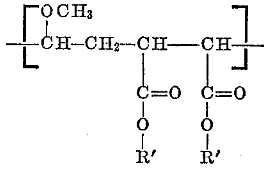

3. The polymer as claimed in claim 2 wherein R' is

—CH$_2$—NH—C(=O)—CH=CH$_2$

4. The polymer as claimed in claim 11 having the structure

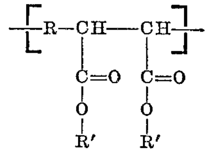

wherein R is

—CH(OCH$_3$)CH$_2$, —CH$_2$—CH=CH—CH$_2$— or —CH(Φ)—CH$_2$— and R′ is

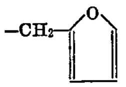

5. A polymer as claimed in claim 1 having the recurring unit structure

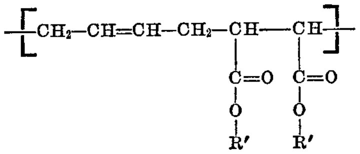

6. The polymer as claimed in claim 5 wherein R′ is $$-CH_2-NH-\overset{\overset{O}{\|}}{C}-CH=CH_2$$

7. A polymer as claimed in claim 1 having the recurring unit structure:

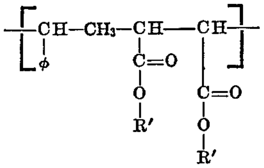

8. The polymer as claimed in claim 7 wherein R′ is $$-CH_2-NH-\overset{\overset{O}{\|}}{C}-CH=CH_2$$

9. A polymer as claimed in claim 1 having the recurring unit structure

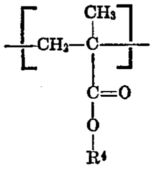

wherein $R^4$ is $$-CH_2-NH-\overset{\overset{C}{\|}}{O}-CH=CH_2$$

10. A light-sensitive organic solvent-soluble film forming polymer capable of forming a continuous coating on a base which comprises recurring units of an esterified polymer having the structure:

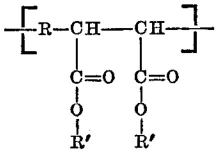

or

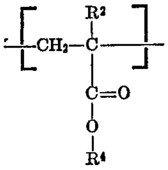

wherein R is $$-CH_2-CH=CH-CH_2-,\ -\underset{\phi}{\underset{|}{C}}H-CH_2-\ \text{or}\ -\underset{OCH_3}{\underset{|}{C}}H-CH_2-$$

R′ is

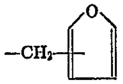

$R^2$ is hydrogen or alkyl containing from 1 to 4 carbon atoms; and $R^4$ is

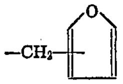

said polymer having a molecular weight of from 1500 to 100,000 and esterified to the extent that at least 25% of the —COOH groups are reacted.

11. The polymer as claimed in claim 10 having the structure

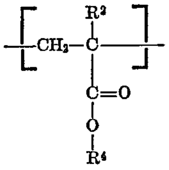

wherein $R^2$ is $CH_3$ and $R^4$ is

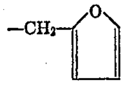

References Cited

UNITED STATES PATENTS

| | | | |
|---|---|---|---|
| 2,129,667 | 9/1938 | Barrett et al. | 260—2 |
| 2,437,955 | 3/1948 | Hersh | 260—17.4 |
| 2,519,764 | 8/1950 | Jacobson | 154—43 |
| 2,999,829 | 9/1961 | Treat et al. | 260—296 |
| 3,218,299 | 11/1965 | Zanaboni et al. | 260—78.5 |
| 3,622,546 | 11/1971 | Engelhardt et al. | 260—78.5 |

STANFORD M. LEVIN, Primary Examiner

U.S. Cl. X.R.

96—67, 86 P, 87 R, 115 P; 117—124 E, 132 R, 132 CB, 138.8 R, 138.8 UA, 145; 260—78.5 T, 80 P, 80.3 R, 89.5 R, 89.5 N